(12) United States Patent
Frank

(10) Patent No.: US 8,584,200 B2
(45) Date of Patent: Nov. 12, 2013

(54) MULTIPLE TIME OUTS FOR APPLICATIONS IN A MOBILE DEVICE

(75) Inventor: Edward H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 921 days.

(21) Appl. No.: 11/240,095

(22) Filed: Sep. 29, 2005

(65) Prior Publication Data

US 2006/0089125 A1 Apr. 27, 2006

Related U.S. Application Data

(60) Provisional application No. 60/621,239, filed on Oct. 22, 2004.

(51) Int. Cl.
*H04L 29/06* (2006.01)

(52) U.S. Cl.
USPC ............... 726/2; 726/3; 726/4; 726/5; 726/6; 726/7; 713/178; 380/247; 455/410; 455/411

(58) Field of Classification Search
USPC ........ 726/1–30; 455/10, 411; 710/44–47, 220
See application file for complete search history.

(56) References Cited

U.S. PATENT DOCUMENTS

| | | | |
|---|---|---|---|
| 5,018,197 A | | 5/1991 | Jones et al. |
| 6,088,451 A | | 7/2000 | He et al. |
| 6,446,225 B1 * | | 9/2002 | Robsman et al. ............... 714/55 |
| 6,525,955 B1 | | 2/2003 | Smith et al. |
| 6,693,819 B2 | | 2/2004 | Smith et al. |
| 6,700,176 B2 | | 3/2004 | Ito et al. |
| 6,704,236 B2 | | 3/2004 | Buer et al. |
| 7,024,556 B1 * | | 4/2006 | Hadjinikitas et al. .......... 713/168 |
| 7,031,695 B2 * | | 4/2006 | Aono et al. .................... 455/411 |
| 2001/0005890 A1 * | | 6/2001 | Nitaki ............................ 713/202 |
| 2001/0051991 A1 | | 12/2001 | Beyda et al. |
| 2002/0074616 A1 | | 6/2002 | Chen et al. |
| 2002/0114519 A1 * | | 8/2002 | Mastrianni et al. ............ 382/199 |
| 2002/0169874 A1 * | | 11/2002 | Batson et al. ................. 709/225 |
| 2003/0008661 A1 * | | 1/2003 | Joyce et al. .................... 455/456 |
| 2003/0065805 A1 * | | 4/2003 | Barnes, Jr. ...................... 709/231 |
| 2003/0105964 A1 | | 6/2003 | Brainard et al. |
| 2003/0120940 A1 * | | 6/2003 | Vataja ............................. 713/193 |
| 2003/0120957 A1 * | | 6/2003 | Pathiyal ......................... 713/202 |
| 2004/0100508 A1 | | 5/2004 | Hansson |
| 2004/0172558 A1 * | | 9/2004 | Callahan et al. .............. 713/201 |
| 2005/0071645 A1 | | 3/2005 | Girouard et al. |
| 2005/0241004 A1 | | 10/2005 | Pyhalammi |

(Continued)

OTHER PUBLICATIONS

Jianpeng, "Study of Single Sign-On Model Within URP Architecture", Aug. 2010, pp. 923-927.*

(Continued)

*Primary Examiner* — Taghi Arani
*Assistant Examiner* — Thaddeus Plecha
(74) *Attorney, Agent, or Firm* — Sterne, Kessler, Goldstein & Fox P.L.L.C.

(57) ABSTRACT

A method for revoking access to a mobile device includes providing a plurality of authenticated applications accessible by the mobile device, and providing a plurality of revocation timeout intervals for revoking access by the mobile device to the plurality of authenticated applications. Access to a first authenticated application is revoked after a first timeout interval and access to a second authenticated application is revoked after a second timeout interval.

16 Claims, 5 Drawing Sheets

(56) References Cited

U.S. PATENT DOCUMENTS

| | | | |
|---|---|---|---|
| 2006/0031377 A1* | 2/2006 | Ng et al. | 709/208 |
| 2006/0068799 A1 | 3/2006 | Morton et al. | |
| 2006/0072748 A1 | 4/2006 | Buer | |
| 2006/0072762 A1 | 4/2006 | Buer | |
| 2006/0089126 A1* | 4/2006 | Frank et al. | 455/411 |
| 2006/0105744 A1 | 5/2006 | Frank | |
| 2006/0105745 A1 | 5/2006 | Frank | |
| 2006/0211404 A1 | 9/2006 | Cromp et al. | |
| 2006/0240818 A1 | 10/2006 | McCoy et al. | |
| 2006/0253894 A1 | 11/2006 | Bookman et al. | |
| 2007/0087756 A1 | 4/2007 | Hoffberg | |

OTHER PUBLICATIONS

Baldi, L. et al., "An Advanced Smart Card Family for Public Key Algorithm," Electronics, Circuits, and Systems, 1996. ICECS '96, Proceedings of the Third IEEE International Conference on Rodos, Greece (Oct. 13-16, 1996), New York, New York, vol. 1, pp. 558-561.

Menezes, Oorschot, Vanstone: "Handbook of Applied Cryptography." CRC Press Series on Discrete Mathematics and Its Applications, 1997, pp. 551-553.

Virage Logic Corporation, "NOVeA White Paper. Non-Volatile Embedded Memory in a Standard CMOS Process." Wirage Logic Corporation Online, Oct. 2003, pp. 1-9. Retrieved from the Internet: <http://www.viragelogic.com/upload/documents/novea_wp.pdf>, retrieved on Nov. 11, 2005.

\* cited by examiner

FIG. 3
PRIOR ART

|        | F₁ | F₂ | F₃ | F₄ | F₅ | F₆ |
|--------|----|----|----|----|----|----|
| USER #1 | X  |    |    |    |    |    |
| USER #2 | X  | X  | X  |    |    |    |
| USER #3 |    |    | X  | X  |    | X  |
| USER #4 | X  |    | X  |    | X  | X  |

ACLS

MULTIPLE TIME OUTS FOR APPLICATIONS IN A MOBILE DEVICE

CROSS-REFERENCE TO RELATED APPLICATION(S)

This application claims priority to and the benefit of U.S. Provisional Application No. 60/621,239, filed Oct. 22, 2004, the entire content of which is incorporated herein by reference.

FIELD OF THE INVENTION

The present invention relates to a system and method for mobile device authentication.

BACKGROUND

Cellular communication systems are multi-user, wireless communication systems capable of concurrent use by large numbers of users. These systems may be packet wireless communication systems providing voice and other real time communications between mobile terminals operable in such a system. Advancements in communication technologies have permitted the development and popularization of new types of mobile devices for use with cellular communication systems. Multi-function mobile communication systems are exemplary of systems made possible as result of such advancements.

In order to ensure the validity of a user of such a system, authentication procedures are carried out to ensure that traffic between the server of the network portion of the system and a mobile device is sent to an intended recipient. Subsequent to authentication, communications are permitted between a mobile device and the server of the network portion of the system.

Recently however, with the advancing sophistication of mobile devices in general, there is an ever-increasing array of services available which may be provided on mobile devices, including cellphones, PDAs and the like. However, authentication procedures used to protect these services have not similarly advanced to match the sophistication of today's mobile devices. Current mobile devices are still authenticated for the most part by a single authentication parameter such as the entry of a pass-code used to "unlock" the device, providing an "all or nothing" approach for mobile device authentication.

Given that the data and services provided by the mobile device vary in importance to a user, and given that authentication procedures will ordinarily be more or less cumbersome based on the level of security they provide, what is needed is a system of authentication offering a tradeoff between these two ideals by tailoring authentication procedures to individual services offered on a mobile device.

SUMMARY OF THE INVENTION

A method for revoking access to a mobile device includes providing a plurality of authenticated applications accessible by the mobile device, and providing a plurality of revocation timeout intervals for revoking access by the mobile device to the plurality of authenticated applications. Access to a first authenticated application is revoked after a first timeout interval, and access to a second authenticated application is revoked after a second timeout interval.

In another embodiment, a method for revoking user access to a mobile communications network includes providing a server; providing a mobile device for communicating with the server; providing a plurality of authenticated applications for receiving data from the server, the authenticated applications having one or more authentication parameters associated therewith; providing a plurality of revocation timeout intervals for revoking access by the server to the plurality of authenticated applications running on the mobile device; associating each of the plurality of authenticated applications provided by the mobile device with one of the plurality of revocation timeout intervals different from the revocation timeout interval associated with any other of the plurality of authenticated applications; regularly polling the plurality of authenticated applications to determine the continued validity thereof; and revoking access to one of the authenticated applications if, during the revocation timeout interval associated with the one of the authenticated applications, the one of the authenticated applications has failed to satisfy the authentication parameters associated therewith.

BRIEF DESCRIPTION OF THE DRAWINGS

FIG. 3 is a matrix defining an exemplary access control list;

Figure 1:
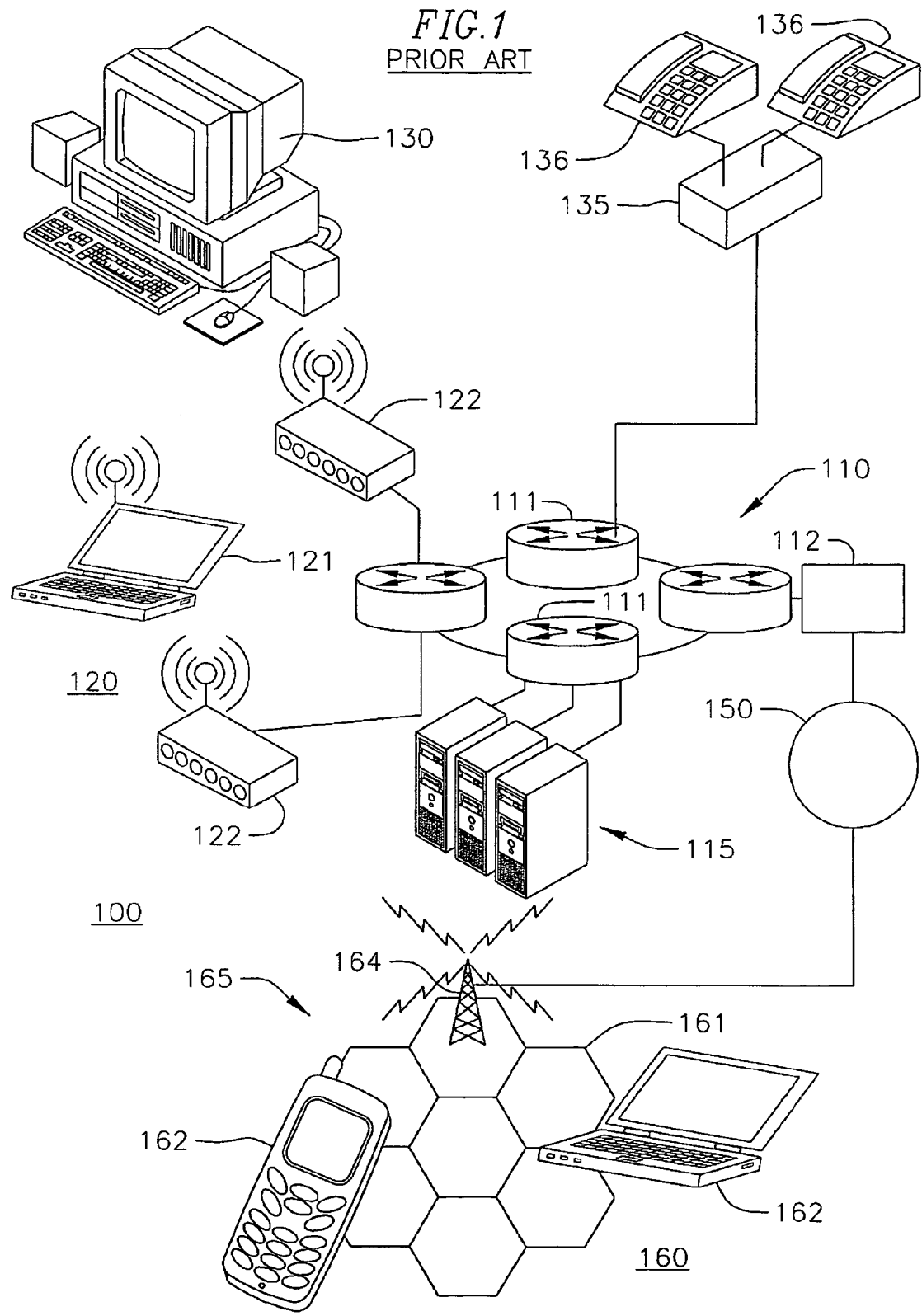
FIG. 1 shows a network architecture in which one or more servers on an internal network can communicate with a mobile device of a wireless network through an external network.

Before any embodiment of the invention is explained in detail, it is to be understood that the invention is not limited in its application to the details of construction and arrangements of components set forth in the following description, or illustrated in the drawings. The invention is capable of alternative embodiments and of being practiced or being carried out in various ways. Also, it is to be understood that the terminology used herein is for the purpose of illustrative description and should not be regarded as limiting.

DETAILED DESCRIPTION

In FIG. 1, a known network architecture 100 is shown to include an internal network 110 coupled to an external network 150 which is in turn coupled to a wireless network 160. The network architecture 100 as a whole permits communication between a mobile device 162 such as a mobile phone or a PDA device associated with the wireless network 160 and associated components of the internal network 110 such as one or more servers 115. Exemplary embodiments of the present invention can be applied to the network architecture of FIG. 1, as well as other suitable architectures.

The internal network 110 may be provided by a LAN covering a corporate campus or other localized setting and includes one or more routers 111. Devices such as desktop clients 130 and telephones 136 are coupled to the one or more routers 111. In one embodiment, the telephones 136 may be coupled through an intermediate device, such as the private branch exchange ("PBX") 135 shown in FIG. 1.

A wireless LAN network ("WLAN") 120 may also be coupled to the internal network 110. The WLAN 120 includes one or more base stations 122 communicating with one or more campus mobile devices 121. Servers 115 are provided coupled to the internal network 110. These servers may be application servers, data servers, function providing servers and authentication servers, among others. The servers 115 provide services to a client accessing the internal network 110 which may require a certain level of protection, such as e-mail service enclosing sensitive data such as financial records and the like, personnel services, and payment services, among others.

In an alterative embodiment of the present invention, the services provided may not be tied to a specific server 115, rather they may be distributed over one or more traditional servers or computers. One or more servers 115 may provide one or more services, or a service may be implemented by one or more servers 115. Moreover, the servers 115 may provide data, applications, and/or functions that originally come from outside of the servers 115, or outside of the internal network 110 entirely, such as Internet-sourced data.

Coupled to the internal network 110 is an external network 150 allowing the internal network 110 to send data to and receive data from sources outside the internal network 110, such as to the wireless network 160 shown in FIG. 1. In one embodiment, the external network 150 may provide POTS telephony services over a Public Switched Telephone Network (PSTN). In alternative embodiments, the external network 150 is a circuit or packet switched public data network, or provides higher speed data services over an integrated services digital network. In a further alternative embodiment (not shown), the internal network 110 may be directly coupled to the wireless network 160. It will be understood by one skilled in the art that the external network 150 may also be provided by the Internet.

The wireless network 160 includes one or more base stations 164 for communicating with mobile devices 162 such as mobile phones or PDA devices. The mobile device 162 may be any device adapted for wireless communications with the wireless network 160, including a cellular telephone, a personal digital assistant, pager, portable computer or vehicle navigation system, as well as others.

As is known to one skilled in the art, transmission and reception between the base stations 164 and the mobile devices 162 occurs in a defined coverage area broken into individual geographic cells 161, each having its own base station. The one or more base stations 164 include radio transceivers defining each geographic cell 161 and providing radio-link protocols to the mobile devices 162. A controller (not shown) may also be coupled between the one or more base stations 164 and a switching center (not shown) to manage and efficiently allocate radio resources for the one or more base stations 164. The controller handles handovers, radio-channel setup and frequency hopping for the mobile devices 162, for instance as they move from one geographic cell 161 to another.

Communication between the base stations 164 and the mobile devices 162 may utilize such multi-access wireless communications protocols as general packet radio services, global system for mobile communications and universal mobile telecommunications system protocols, as well as others. In alternative embodiments, High Data Rate (HDR), Wideband Code Division Multiple Access (WCDMA) and/or Enhanced Data Rates for GSM Evolution (EDGE) may also be supported.

As is known to one skilled in the art, a firewall 112 may be interposed between the external network 150 and the internal network 110 to better protect data stored on the servers 115 of the internal network 110 from external attack. Those skilled in the art will also be familiar with the concept of access control lists ("ACLs"), which may be implemented in routers such as firewalls positioned between an internal network and an external network such as the Internet. ACLs are lists configured at a router to control access to a network, thereby preventing certain traffic from entering or exiting that network. More specifically, ACLs can be configured for all routed network protocols to filter the packets of those protocols as they pass through the router. By using ACLs to determine which types of traffic are forwarded or blocked at a router interface, the router can be set up, for example, to permit e-mail traffic to be routed while at the same time blocking all Telnet traffic.

To provide the security benefits of access control lists, they should at a minimum be configured on the border routers situated at the edges of a network, such as at the firewall 112 shown in FIG. 1 interposed between the internal network 110 and the external network 150. This provides a basic buffer from the external network 150. ACLs are configured for each network protocol configured on the router interfaces. ACLs can also be used on a router positioned between two parts of an internal network, such as the routers 111 shown in the internal network of FIG. 1, to control traffic entering or exiting specific parts of that internal network. Accordingly, less controlled areas of the network may be separated from more sensitive areas of the network, permitting important data to be partitioned in a high security portion of the network architecture.

Figure 2:
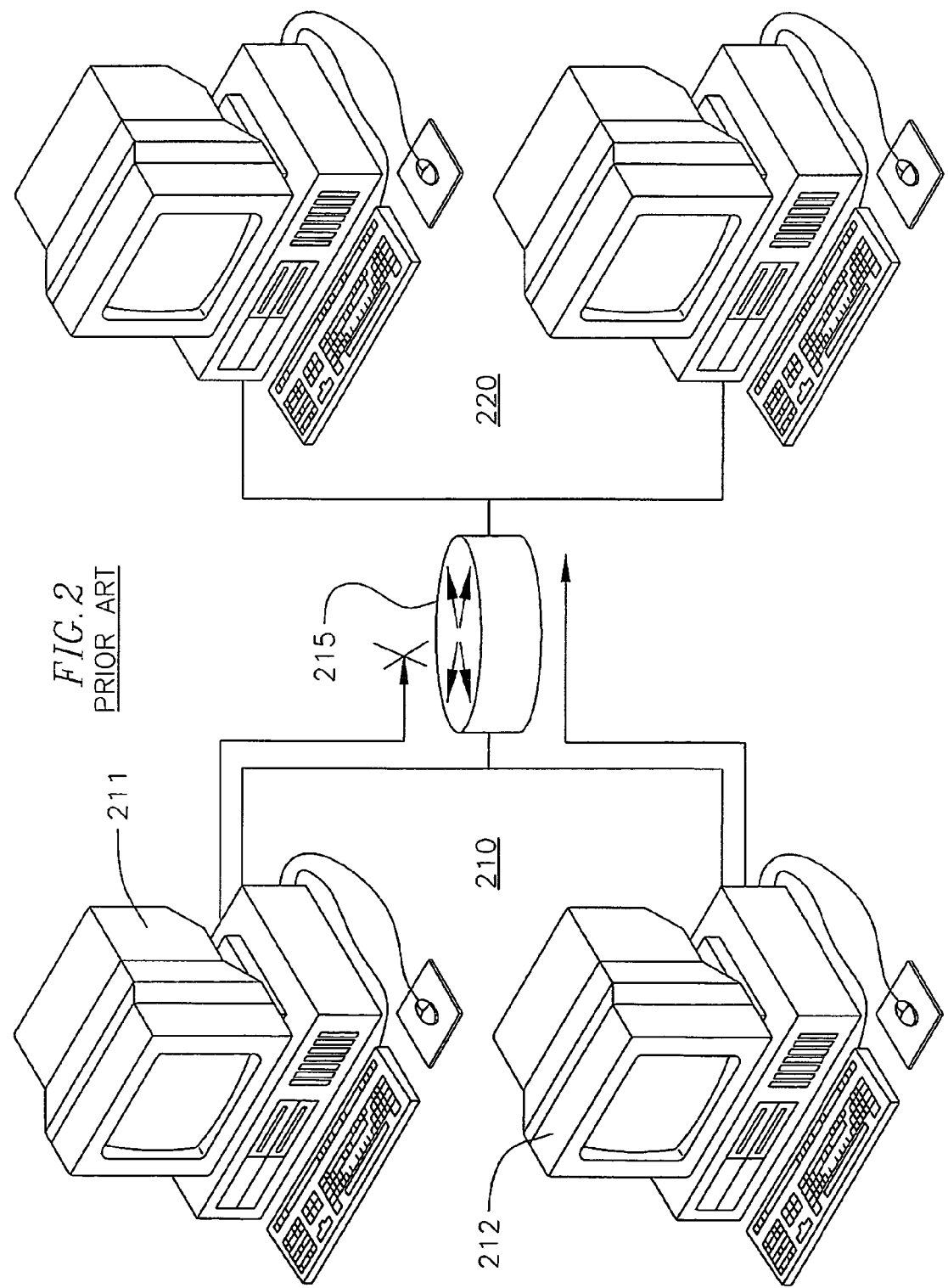
FIG. 2 shows a simple network in which two sub-networks are coupled by a router which selectively passes traffic between the two sub-networks based on the contents of an access control list stored on the router.

ACLs can be used, for example, to allow one host to access a part of a network and prevent another host from accessing the same area, instead of allowing all packets passing through the router to be allowed onto all parts of the network. FIG. 2 shows a simple prior art network, in which a first network 210 and a second network 220 are coupled by a router 215. Because of the configuration of an ACL maintained on the router 215, a second host 212 is allowed to access the second network 220 while the first host 211 is prevented from accessing this same network.

FIG. 3 shows a variation of this concept wherein different types of traffic are allowed or denied to different users of a network. An access control list matrix 300 is shown for a series of users 325, wherein user profiles are defined in a series of matrix rows 310. For each user 325, access to one or more applications 315 is determined by that user's corresponding designations in one of a series of matrix columns 320.

Multi-dimensional user oriented ACL matrices of the type exemplified by the matrix 300 of FIG. 3 are commonly used between distinct portions of an internal network, such as with the network architecture shown in FIG. 2. However, it is also desirable to control the distribution of data between, as well as within, individual networks, such as, for example, between the internal network 110 and the wireless network 160 of FIG. 1 so that a user of a mobile device 162 is able to access data stored on the servers 115. This is perhaps an even more critical application given the ever-widening scope of distribution of potentially sensitive data once it leaves the internal network 110. However, it will be understood that the following techniques are applicable to any wireless network or sub-network communicating with a multifunction mobile device, such as, for instance, the WLAN network 120 of FIG. 1.

With the advancing sophistication of mobile devices such as cellphones, PDAs and the like in general, there is an ever-increasing array of services which may be provided on the mobile device 162 of FIG. 1. Multiple services may be provided on the mobile device 162, such as mail, music, photo and other services in addition to traditional voice service. As such, there are potentially many different types of data which may be sent between the servers 115 of the internal network 110 and the mobile devices 162 of the wireless network 160.

While access control lists may be incorporated into the firewall 112 to determine what types of data are allowed to pass to the mobile device 162, once the data has left the confines of the internal network 110 and been sent to the mobile device 162, it is incumbent on the device itself and the user of that device, to maintain the security of the data.

To aid in this endeavor, known security measures provide that a user of a mobile device must first authenticate herself to that device before she is able to access the features of the device and data stored thereon. In an embodiment of the present invention, this method may be extended such that a user must authenticate herself to an authentication server of the internal network 110 before she is able to retrieve data from the servers using her mobile device 162. However, the current paradigm is such that once a relationship has been established with an intended user of the mobile device 162 and the internal network 110 to access data stored on the servers 115 of the internal network 110, that user is able to access the full range of features of the mobile device 162.

For example, to avoid unauthorized users from obtaining access to data sent from the internal network 110 to the mobile device 162, authentication parameters have been used to activate the mobile device 162 only when, for instance, the correct authentication code has been entered by the user into a keypad of the mobile device 162. Entry of this code allows a user of known mobile devices to access the full range of features of the device, such as voice services, receiving e-mail and attachments, etc.

Furthermore, data provided to the mobile device 162 by the internal network 110 may vary in importance. Highly important data may require more secure and sophisticated authentication schemes to reduce the risk of unintended disclosure to third parties. There is, however, an inherent tradeoff between the ease with which an authentication method may be practiced and the security of such a method. Entry of a PIN code may be easy to carry out, but offers less security than the authentication of biometric data such as a thumbprint.

Figure 4:
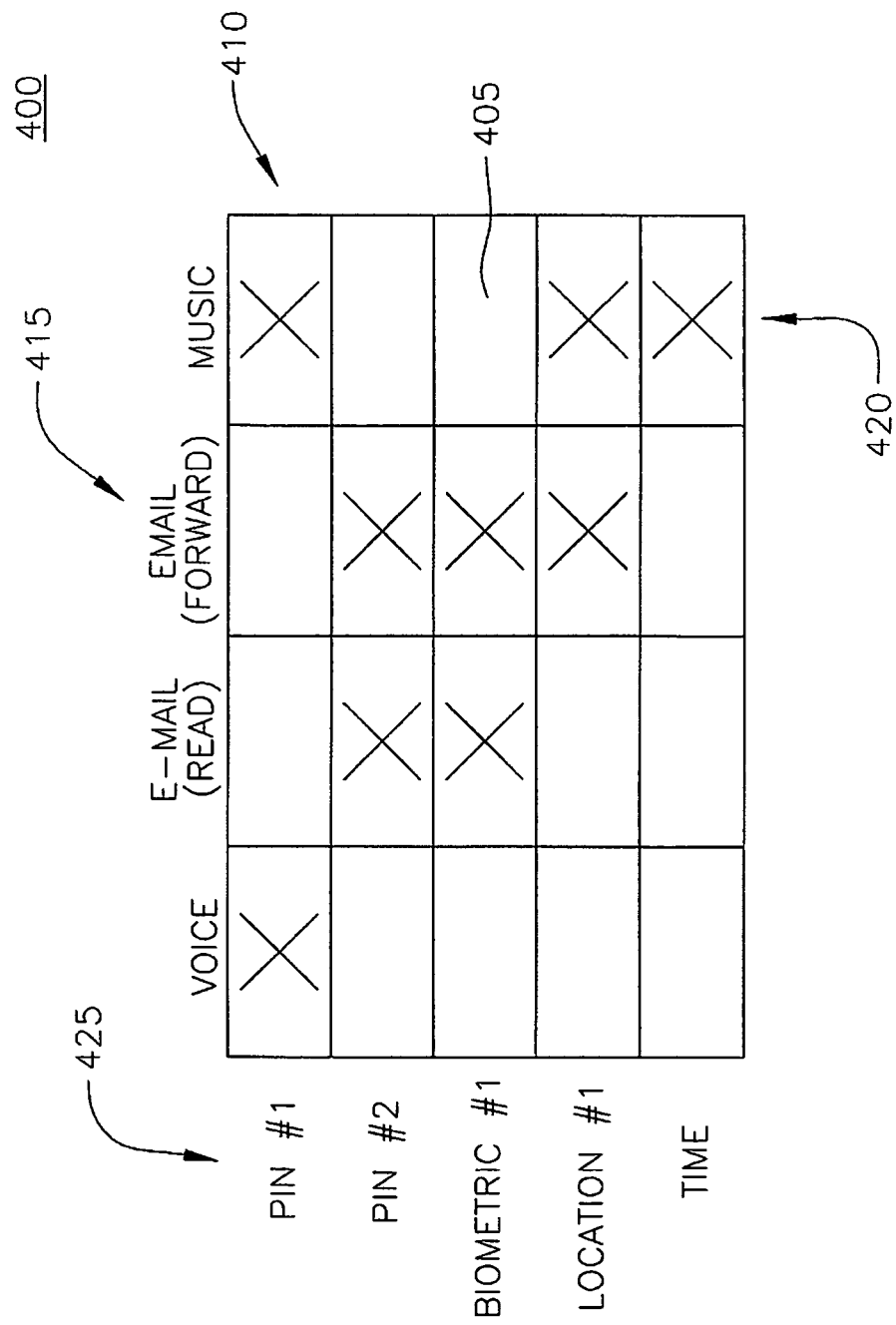
FIG. 4 is an alternative authentication matrix according to another embodiment of the present invention.

As such, it is desirable that a range of methods be available to protect different types of data and different features offered on a mobile device. FIG. 4 shows an exemplary authentication matrix 400 according to one embodiment of the present invention having a range of authentication parameters in one dimension, and a range of protectable features in another. Specific applications 415 are provided by a mobile device. These applications 415 are associated with the matrix rows 410, and specific authentication parameters 425 for allowing access to the applications 415 on the mobile device are associated with authentication schemes 420 arranged in matrix columns. Accordingly, individual cells 405 are created determining the applicability of a particular authentication parameter 425 to a particular application 415.

The authentication parameters 425 can be freely and independently assigned to the applications 415 to create a unique authentication scheme 420 for a mobile device. In alternate embodiments of the present invention, one or more authentication parameters 425 may be selected for each application 415. In further alternative embodiments, a separate authentication parameter 425 may be used for each application 415, or an authentication parameter 425 may be repeated for more than one application 415.

In the embodiment shown in FIG. 4, the applications 415 include voice telephony services, music services, and e-mail services, including the separate applications 415 of access to incoming e-mail, and the ability to alter or forward that e-mail to a third party. Further, the range of protectable features is intended to encompass any features that may be offered on the mobile device 162 such as telephony services, e-mail, GPS data, stock quotes and the like. The range of authentication parameters may include the entry of one or more key codes, biometric data such as a thumbprint, voice analysis, the physical location of the mobile device 162, the time of day, proximity to or use of an enabling device such as a magnetically encoded card, radio frequency identification tag, and the like. This list is not inclusive, and it will be apparent to one skilled in the art that any method of authentication, including no authentication method, is appropriate to include in this dimension of the authentication matrix.

Entries in the individual cells 405 indicate the applicability of a particular authentication procedure 425 to a particular application 415. For example, in the embodiment shown, voice services are provided as an application 415 on a mobile device enabled by a user of the mobile device authenticating herself by entering a first PIN code. The ability to download and read e-mail from a server is provided as a second application 415 which may be enabled by the a second PIN, together with a biometric authentication procedure. This procedure may include, in alternative embodiments, a voice, thumbprint, retina scan or the like. While more cumbersome than the entry of a simple PIN code, this level of security may be necessary if sensitive data is routinely being accessed by the user of the mobile device employing the authentication matrix shown in FIG. 4.

In alternative embodiments not shown, rather than being monolithically authenticated, e-mail downloading may be broken into separate higher and lower security applications 415 with distinct authentication schemes based on the source of that e-mail. A directory may be provided having one or more groups of e-mail addresses whereby an authentication scheme is provided for each group of e-mail addresses which may be either higher or lower than the default authentication scheme which allows a user to access e-mail sent from a sender not on the list. In a further alternative embodiment, the ability to download and open attachments to e-mail messages may itself be a separate application 415 requiring its own authentication scheme 420.

The authentication matrix 400 includes the ability to edit and/or forward e-mail received by the mobile device as yet another separate application 415, the authentication scheme 420 associated therewith requiring the entry of the second PIN as well as the biometric data. In addition to these two parameters 425, a third parameter is used, namely the physical location of the mobile device. This parameter may be provided by known global positioning system ("GPS") technology incorporated within the mobile device such that the authentication parameter 425 is satisfied only when the mobile device is in one of a set of predefined geographic locations. For example, a particular application 415 may be restricted so as to only be available when a user is on her corporate campus, at her home, or at another predefined location, providing further increased security to highly sensitive applications 415.

Music downloading and replay applications may be provided as shown in the authentication matrix 400 of FIG. 4 having yet another authentication scheme 420 associated therewith. In addition to the entry of a first PIN, the location of the mobile device is again used as an authentication parameter 425. However, a separate list of predefined geographic locations may be provided for this application, as opposed to the application discussed previously. For example, the mobile device could be restricted to only allow music services when the user of the device was at a location other than her corporate campus, so that nonessential activities are prevented in a business setting.

In addition, the time of day may be utilized as an authentication parameter 425 so that, for example, the application of providing music or other entertainment services on a mobile device can be restricted to after normal business hours only.

The application of the aforementioned authentication parameters 425 has been discussed in the conjunctive such that for a particular application 415, each designated parameter 425 must be satisfied to authenticate a user so that she may access that particular application 415. However, it is understood that in an alternative embodiment, these authentication parameters 425 may be applied in the disjunctive, such that the entry of any one parameter designated for a particular application enables the usage of that application.

In an alternative embodiment, the authentication parameters 425 may be made to behave in a more subtle fashion using more complex Boolean logic schemes. For example, in the matrix 400 of FIG. 4, an authentication scheme 420 is provided for music or other entertainment services on a mobile device. The authentication scheme 420 dictates that a first PIN, as well as a location and a time parameter 425, are all required to authenticate this application 415 for the mobile device. For this discussion, these parameters will be referred to as parameters A, D and E. The purely conjunctive authentication scheme produces the Boolean expression (A and D and E)=authentication. However, it is within the purview of the present system and method that, for example, this application always be provided for the user of the mobile device when she is at a defined location such as her home. Otherwise, this service may still be available provided the local time is between 5:00 p.m. and 12:00 a.m. and provided the user has entered the correct PIN. This scheme yields the Boolean expression (D or (A and E))=authentication.

Alternatively, this application may be provided only between 5:00 p.m. and 12:00 a.m., provided in addition that either the user has entered the correct PIN, or the user of the mobile device is at a defined location such as her home. This scheme yields the Boolean expression (E and (A or D))=authentication. This scheme would be useful for both completely preventing the provision of this service during normal business hours, as well as avoiding the hassle of entering a cumbersome PIN assuming the user is at a location that is itself relatively secure.

In a further alternative embodiment, the conditions for satisfying individual parameters can themselves be made to change depending on the satisfaction of other, separate parameters. For instance, the application may be provided only at a defined location such as a user's home if the local time is between 9:00 a.m. and 5:00 p.m., or it may be provided at a different location if the time is otherwise, such as an expanded zone encompassing the user's hometown, provided that the user has also entered the correct PIN. This scheme yields the Boolean expression ((E and D) or (D' and A))=authentication.

It is understood that the authentication schemes 420 shown in the authentication matrix 400 may be utilized both as authentication parameters 425 which must be fulfilled to authenticate a user of a mobile device and begin using certain applications, and also as authentication parameters 425 which must be maintained so that access to an application is not revoked. Just as a predefined change in state from invalid to valid of an authentication parameter 425 allows the authentication of a particular application, an inverse change of state of an authentication parameter 425 may be used to revoke access to a particular application. As such, the authentication parameters 425 function, through their inverses, as revocation parameters.

For example, a process may be carried out at the server whereby at a periodic time interval t, a poll is taken of the parameters in the authentication schemes for each mobile device. If the status of these parameters has changed so that they are no longer valid, for instance with respect to the current location or time, access to the application in question is revoked. The mechanism for this revocation is discussed in more detail with reference to FIG. 5 below. For authentication parameters that require some amount of user input, the mobile device may prompt a user to reenter her PIN, for example.

In an alternative embodiment, for user entered authentication parameters such as pass codes, continual use of the mobile device every fractional time period t/f may be sufficient to avoid the necessity to reenter the pass code. In a further alternative embodiment, the process may be carried out at the mobile device itself whereby at a periodic time interval t, parameters in the authentication scheme for the mobile device are polled.

In yet another alternative embodiment, a separate time interval t may be provided for each application provided at the mobile device. Accordingly, for example, low security applications like basic phone service must be re-authenticated every time interval t, while higher security applications such as e-mail must be re-authenticated every shorter time interval t'.

Furthermore, an application may be provided at the mobile device such that no re-authentication is possible. For certain very high security applications, such as those concerning sensitive documents attached to e-mail, an application may be defined as downloading, opening and viewing this particular class of e-mail attachment during the time interval t, after which point an authentication server will use its copy of the authentication key for this application to erase the original copy stored on the SIM card of the mobile device itself. The server also erases the synchronized data, i.e. the attachment, from the SIM card at this time. Of course, in another alternative embodiment the authentication server is capable of altering the authentication scheme of this application during the time interval t such that the time limit is extended or removed completely, or the rights inherent in the application may be otherwise enhanced, such that, for instance, an e-mail attachment that could only be read prior to the enhancement can thereafter be forwarded as well.

Furthermore, it is also understood that in an alternative embodiment of the present invention, the failure to select any authentication parameters 425 for a particular application 415 is a valid choice. Accordingly, for certain low security applications 415, the authentication scheme 420 may include a null set of authentication parameters. With the advent of increasingly lower cost wireless phone service, a user may, for example, desire that the simple ability to place telephone calls from her mobile device be essentially unprotected, whereas more critical applications such as the ability to access potentially sensitive e-mail information be protected by a password or other authentication parameters 425.

The aforementioned authentication matrices and schemes define what parameters must be satisfied to allow particular types of data to be sent from a server to a mobile device. Described herein is a method for implementing the matrix authentication procedures of FIG. 4 with an exemplary network architecture, in which the authentication parameters of FIG. 4 may be used to provide authentication keys to authenticate a user of a mobile device to a particular application being offered over a network.

Figure 5:
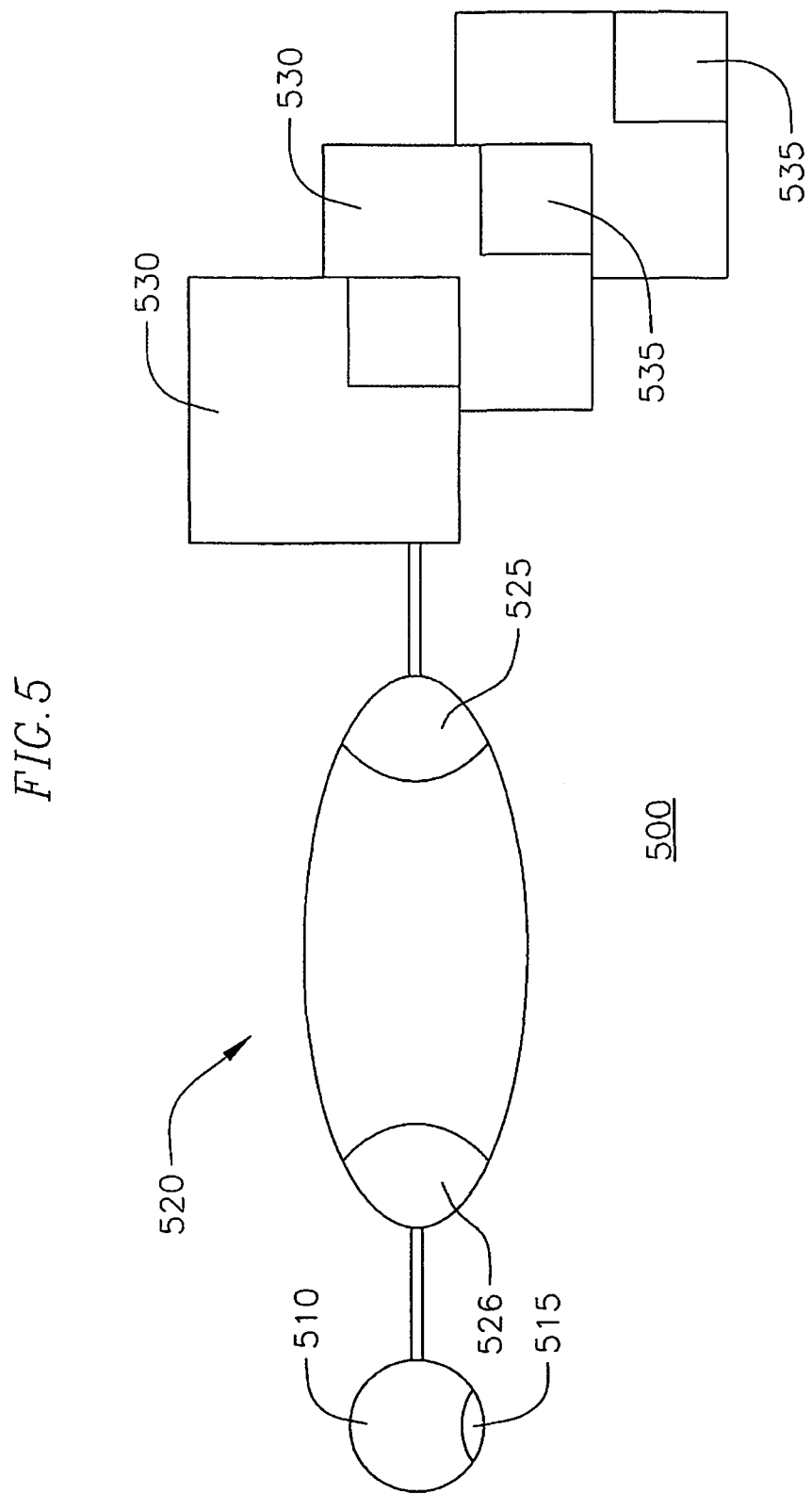
FIG. 5 is a simplified network architecture used for illustrating methods of implementing the matrix authentication procedures described with reference to FIG. 4.

FIG. 5 shows a simplified architecture according to an alternative embodiment of the present invention. An architecture 500 includes a mobile device 510 communicating with one or more servers 530 using a network 520. In one embodiment, the network 520 includes one or more base stations 526 in radio contact with the mobile device 510 as well as a switching center 525 for managing the base stations 526. The mobile device 510 includes a key storage device 515, and the servers 530 include registers 535.

The key storage device 515 of the mobile device 510 may be a Subscriber Identity Module ("SIM"). SIM cards are widely used in mobile devices such as cell phones to store a user's personal info, such as contact lists and the like, as well as identifying information. In an exemplary embodiment of the present invention, the SIM contains authentication keys specifying particular applications so that the user of the mobile device 510 can be identified and authenticated to the network 520 to receive data from the servers 530 for the specified application. In an alternative embodiment, the SIM card may include an authentication key having a private key and a related but different public key, a copy of which is made available outside the SIM.

Of the one or more servers 530, one may be provided in an exemplary embodiment as an authentication server having a register 535, the register 535 being a protected database storing copies of the authentication keys stored in the SIM card specifying particular applications. The authentication server ensures the legitimacy of a user and associates the user to specific application based data services on a data server which may be included as one of the servers 530.

In a further embodiment, the authentication server (and/or another server) may be used to revoke one or more of the secret keys on the SIM card using copies of the secret keys and/or another key of the authentication server. This revocation erases the key from the its location on the mobile device, namely the SIM card. This remote revocation by the authentication server 530 occurs wirelessly through the network 520, with the result that the application to which the mobile device 510 had been authenticated using that key is no longer available.

For the purpose of that application, and that application only, the link between the mobile device 510 and the server 530 is terminated. However, the mobile device could still continue to receive data from these servers 530 for other authenticated applications. Further, the process of revocation of a previously authenticated application can result in the erasure of synchronized data stored on the mobile device for that application.

The PINs shown as authentication parameters 425 in FIG. 4 may be used as private authentication keys, and the data gathered for the other authentication parameters 425 such as the time, location and biometric data could be used to generate separate private authentication keys.

A challenge can then be supplied to the SIM card by the authentication server of the servers 530, and a response is generated using the private key. The response can be checked by the use of the related public key. Thus, if the private key is held only within the SIM card, then only the SIM card can generate an authentication response that would work with the public key value.

For example, in one embodiment, the network 520 is a GSM compliant network authenticating a user to a particular application using a challenge-response mechanism. A random number is sent to the mobile device 510 from the authentication server 530 with an authentication algorithm using the aforementioned public authentication key. The mobile device 510 then computes a signed response based on the random number sent to the mobile device 510 using a hashing algorithm, and returns the computed value.

Upon receiving the signed response from the mobile device 510, the authentication server 530 repeats the calculation to verify authenticity. The authentication key is not transmitted over the radio channel; it should only be present in the SIM, as well as the register 535 of the server 530. In one alternative embodiment, this authentication procedure can be carried out by an application running on a general purpose computer at the server 530.

It will be apparent to one skilled in the art that while a system using SIM devices and a GSM mobile network has been described herein, the inventive concepts described above would be equally applicable to systems that use other types of smartchips and/or other types of mobile networks.

In a further alternative embodiment of the present invention, the key storage device 515 of the mobile device 510 further includes a Hardware Security Module ("HSM") chip providing encryption capabilities to add a further level of security to data accessed using the mobile device 510. The HSM chip contains an encryption key for encrypting voice and data transmissions to and from the network 520. An encrypted communication is initiated by an encryption request command from the network 520. Upon receipt of this command, the mobile device 510 begins encryption and decryption of data using the HSM chip. In yet another alternative embodiment, data stored on a SIM, such as retained e-mail traffic, contact information, personal information and the like could be stored in an encrypted state, and decrypted only when needed, using the HSM chip.

Regarding the above described key storage device 515, a stateless module may be used which provides a high level of security at a relatively low cost, while consuming a relatively small amount of space on the mobile device. Mechanisms are provided for securely loading one or more keys into the stateless module, securely storing the keys and securely using the keys. Embodiments of exemplary stateless modules that provide such mechanisms are provided in copending provisional patent application Ser. No. 60/615,290, entitled Stateless Hardware Security Module, filed on Oct. 1, 2004, now filed as patent application Ser. Nos. 11/159,640, filed Jun. 21, 2005, and Ser. No. 11/159,669, filed Jun. 21, 2005, and assigned to the assignee of the present application, the entire contents of which are incorporated herein by reference.

In another alternative embodiment, the HSM chip, rather than the SIM, contains the authentication keys and performs the authentication procedures described above to authenticate a user to a particular application provided over the network 520 to the mobile device 510.

What is claimed is:

1. A method for selectively controlling access by a mobile device to a plurality of network-based services, wherein the plurality of network-based services includes an e-mail service, comprising:

associating the e-mail service with a plurality of user-enterable authentication parameters and an authentication timeout interval representing a period of time between authentications of the mobile device for the e-mail network-based service, including:

associating a first user-enterable authentication parameter in the plurality of user-enterable authentication parameters with a first e-mail source and a second user-enterable authentication parameter in the plurality of user-enterable authentication parameters with a second e-mail source;

requesting re-authentication of the mobile device by a network server of the mobile device for the e-mail service after the first authentication timeout interval has expired;

associating a second network-based service in the plurality of network-based services with a third user-enterable authentication parameter for the mobile device, and a second authentication timeout interval for the mobile device representing a period of time between authentications of the mobile device for the second network-based service; and requesting re-authentication by the network server of the mobile device to the second network-based service after the second authentication timeout interval has expired;

wherein the first authentication interval is not equal to the second authentication timeout interval.

2. The method of claim 1, further comprising:
associating first authentication data with the e-mail service.

3. The method of claim 1, wherein the plurality of network-based services accessible by the mobile device are provided by one or more network servers.

4. The method of claim 3, further comprising sending data between the one or more network servers and the mobile device in response to access by the mobile device to a network-based service associated with the one or more network servers.

5. The method of claim 1, wherein the first user-enterable authentication parameter is a pass code.

6. The method of claim 2, wherein the first authentication data for the mobile device includes geographic location of the mobile device.

7. The method of claim 1, wherein the first user-enterable authentication parameter is biometric data of a user of the mobile device.

8. The method of claim 2, further comprising:
authenticating access to the e-mail service by the mobile device using the first authentication data for the mobile device and the first user-enterable authentication parameter.

9. The method of claim 2, wherein the first authentication data includes RFID tag data for the mobile device.

10. A system for selectively controlling access by a mobile device to a plurality of network-based services, wherein the plurality of network-based services includes an e-mail service, comprising:

a processor configured to:
associate a first authentication timeout interval with the e-mail service, a first user-enterable authentication parameter with a first e-mail source and a second user-enterable authentication parameter in the plurality of user-enterable authentication parameters with a second e-mail source, request re-authentication of the mobile device after the first authentication timeout interval has expired, associate a second network-based service in the plurality of network-based services with a third user-enterable authentication parameter for the mobile device and a second authentication timeout interval for the mobile device representing a period of time between authentications of the mobile device for the second network-based service, request re-authentication of the mobile device to the second network-based service after the second authentication timeout interval has expired;

wherein the first authentication interval is not equal to the second authentication timeout interval; and a secure memory configured to store the first user-enterable authentication parameter, the second user-enterable authentication parameter, and the third user-enterable parameter.

11. The system of claim 10, wherein the processor is further configured to associate first authentication data with the e-mail service.

12. The system of claim 10, wherein the processor is further configured to terminate access to one or more of the plurality of network-based services to prevent transmission of data associated with the one or more of the plurality of network-based services between the mobile device and the one or more of the plurality of network-based services.

13. The system of claim 10, wherein the processor is further configured to authenticate the mobile device to the e-mail service using one or more pass codes.

14. The system of claim 11, wherein the first authentication data for the mobile device includes a geographic location of the mobile device.

15. The system of claim 10, wherein the first user-enterable authentication parameter includes one or more biometric data of a user of the mobile device.

16. The system of claim 11, wherein the first authentication data includes RFID tag data for the mobile device.

* * * * *